May 11, 1965   J. PICKLES   3,183,314
SEAT ADJUSTING MECHANISM POSITION RESPONSIVE SWITCH
Filed Aug. 10, 1959   2 Sheets-Sheet 1
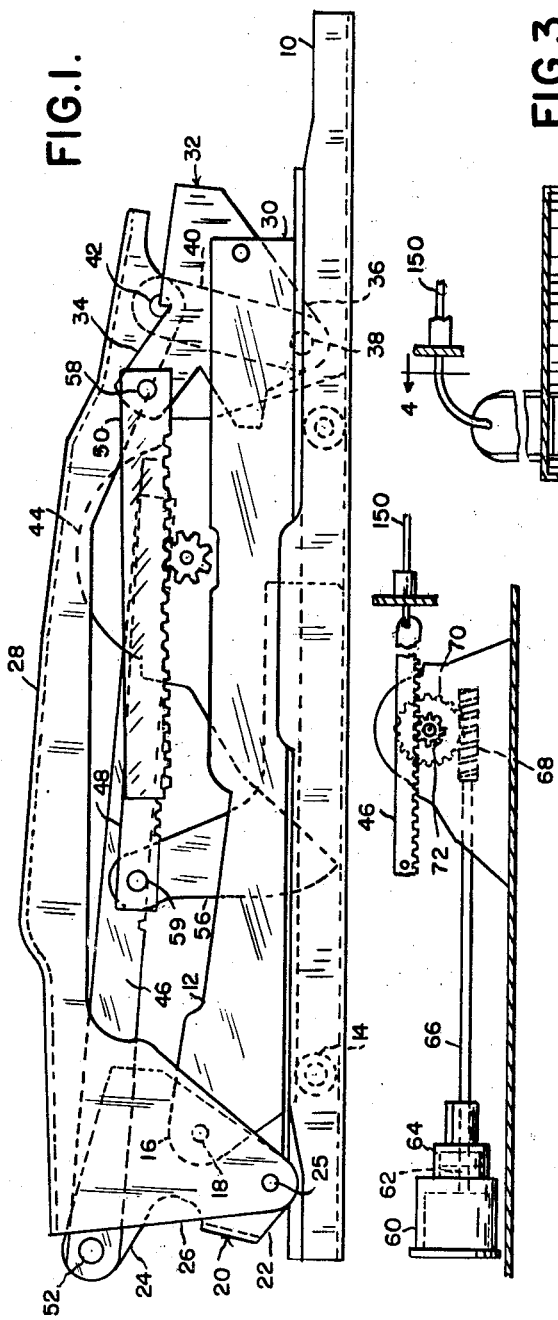
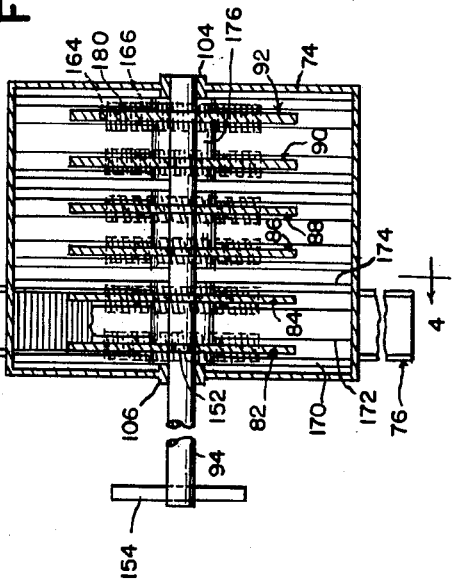
INVENTOR.
JOSEPH PICKLES
BY *Whittemore*
*Hulbert & Belknap*
ATTORNEYS May 11, 1965   J. PICKLES   3,183,314
SEAT ADJUSTING MECHANISM POSITION RESPONSIVE SWITCH
Filed Aug. 10, 1959   2 Sheets-Sheet 2

INVENTOR.
JOSEPH PICKLES
BY *Whittemore,*
*Hulbert & Belknap*
ATTORNEYS

United States Patent Office 3,183,314
Patented May 11, 1965

3,183,314
SEAT ADJUSTING MECHANISM POSITION RESPONSIVE SWITCH
Joseph Pickles, Dearborn, Mich., assignor to Ferro Stamping Company, Detroit, Mich., a corporation of Michigan
Filed Aug. 10, 1959, Ser. No. 832,782
18 Claims. (Cl. 200—1)

The present invention relates generally to memory type seat adjusters and refers more particularly to a position responsive switch for performing the memory function of such a seat adjuster.

This application is a continuation-in-part of application Serial Number 739,722, filed June 4, 1958, now abandoned.

In memory type seat adjusting systems capable of movement of a seat from any position thereof to a fully lowered and retracted position or to a variable predetermined position such as that disclosed in Patent No. 3,105,669, it is necessary to provide a position responsive switch actuable on the seat reaching the fully lowered and retracted or the desired predetermined position and settable to vary the predetermined position at which the switch actuates. Such switch should of course be as simple in operation and construction as possible to assure proper operation and economy of manufacture thereof.

Therefore it is one of the objects of the present invention to provide an improved position responsive switch for performing the memory function of a seat adjuster.

Another object is to provide an improved position responsive switch for performing the memory function of a seat adjuster portions of which are settable to actuate on the seat reaching variable predetermined positions.

More specifically it is an object to provide an improved position responsive switch for use in a memory type seat adjuster having portions thereof actuable on the seat reaching a fully lowered and retracted position and a pair of other positions separately actuable on the seat reaching separate ones of two predetermined intermediate positions, said other portions being settable to actuate on the seat reaching different intermediate positions.

Still more specifically it is an object to provide an improved position responsive switch for use in a memory type seat adjuster including a plurality of rack members movable in accordance with the movement of a seat which it is desired to adjust, a separate limit switch operable by each of said rack members on said seat reaching limiting positions, a plurality of pairs of camming discs, each pair normally being in contact with a different rack for movement therewith, a position sensing switch operated by each of said camming discs on movement of said racks, the position sensing switch being adapted to be opened in one position of said racks, and means for disengaging said racks and one disc associated with each rack and positioning said one disc with respect to said racks to cause said switch associated therewith to open on said racks reaching the same position thereof on later movement of said racks and for reengaging said racks and discs.

It is another object to provide the above recited position responsive switch wherein the last mentioned means includes a manually operable crank having oppositely eccentric portions and also includes spring bias means.

It is still another object to provide an improved position responsive switch for use in a memory type seat adjuster which is simple to operate, economical to construct and efficient in use.

Other objects and features of the invention will become apparent as the description proceeds, especially when taken in conjunction with the accompanying drawings, illustrating a preferred embodiment of the invention, wherein:

FIGURE 1 is an elevation of a seat supporting and adjusting mechanism with which a position responsive switch according to the invention may be used.

FIGURE 2 is a diagrammatic view showing a typical portion of a single motor multiple drive unit for use with the seat supporting and adjusting mechanism of FIGURE 1 and a position responsive switch according to the invention, including a connection from a motor through a clutch to a worm actuating a rack driving pinion and also indicating the Bowden wire connection from a rack member operable to move said seat to a rack member movable to actuate said position responsive switch.

FIGURE 3 is a section view of a position responsive switch according to the invention taken on line 3—3 in FIGURE 4 and showing a representative connection with the actuating racks thereof of a Bowden wire from the seat actuating racks.

Figure 4:
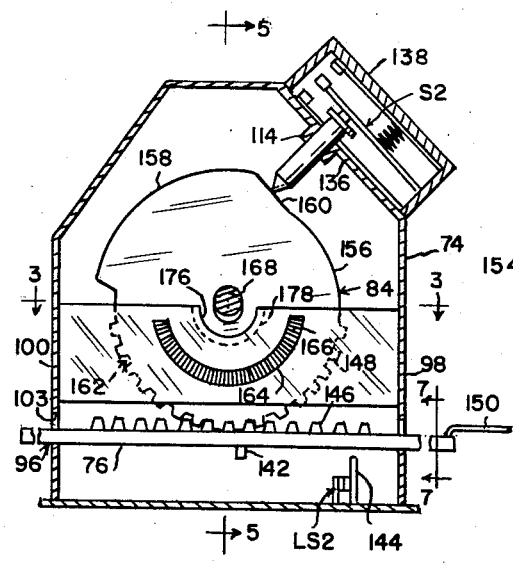
FIGURE 4 is a section through the position responsive switch of the invention taken on the line 4—4 in FIGURE 3.

Referring now to the drawings, the position responsive switching device of the invention is illustrated in conjunction with an article such as a seat, the adjustment of which is effected by providing a lower slide movable fore and aft of a vehicle on fixed rails, and seat support frame elements which are pivotally connected by levers at the front and rear ends to the slide. Obviously, fore and aft movement of the slide effects fore and aft adjustment of a seat mounted on the seat frame elements. The levers which interconnect the front and rear ends of the slide and seat frame elements are preferably bell type crank levers so connected as to produce generally up and down movement of the corresponding ends of the seat frame elements on rocking movement of the levers. With this arrangement it is of course apparent that by suitably actuating the levers at both the front and rear of the seat frame elements, the seat may be raised or lowered. If only one of such levers is actuated the seat is tilted either forwardly or rearwardly.

The foregoing seat adjusting mechanism is best illustrated in FIGURE 1 where one of the stationary rails or tracks is indicated at 10 and is adapted to be bolted or otherwise secured to the floor of the vehicle. It will of course be understood that a pair of such rails are provided located adjacent opposite ends of the seat and similarly, a pair of slides and seat frame elements are also provided.

Mounted for fore and aft adjustment on the stationary rail or track 10 is a slide 12, suitable rollers for providing for relatively free adjustment of the slide 12 being shown at 14. Adjacent the forward end of the slide 12 is an upstanding ear 16 affording a pivot mounting as indicated at 18 for a bell crank lever 20 having a lifting arm 22 and an actuating arm 24. Pivotally connected, as indicated at 25, to the lifting arm 22 of the bell crank lever 20 is a depending arm 26 of the seat frame element 28.

Similarly, a pivot mounting 30 is provided adjacent the rear end of the slide 12 to which is secured a bell crank lever 32 having an actuating arm 34 and a lift arm 36. The lift arm 36 has pivotally connected thereto, as indicated at 38, a lifting link 40 the upper end of which is pivotally connected, as indicated at 42, to the rear end of the seat frame element 28.

In order to effect power actuation of the seat to various adjusted positions, there is provided for movement with the slide 12 a drive unit 44 having therein three pinions (not shown) each of which is in mesh with an actuating rack. The three actuating racks are shown at 46, 48 and 50. The rack 46 at its forward end is pivotally connected as indicated at 52 to the actuating arm 24 of the front lift bell crank lever 20. The rack 48 is pivotally connected as indicated at 59 to a stationary post 56 which may be connected to the stationary rail or track member 10, or may be connected directly to the floor of the vehicle. The rack 50 is pivotally connected as indicated at 58 to the actuating arm 34 of the rear lift bell crank lever 32.

Each of the three pinions in mesh with the racks 46, 48 and 50 is separately actuated and in accordance with the present invention a single electric motor may be provided selectively coupled to one or more of the pinions by flexible drive shafts which are selectively clutched to the transmission means. Such single motor multiple drive units are fully set forth in Patent No. 2,931,242 and will therefore be considered only briefly herein. Reference is made to the cited commonly owned patent for a detailed consideration of a particular single motor multiple drive unit.

Referring now to FIGURE 2 there is shown more or less diagrammatically a motor 60 having an output shaft 62 connected to a gear and clutch box indicated generally at 64. Within the box 64 are a plurality of intermeshing gears driven from the motor 60 each of which is connected through a solenoid actuated clutch to a flexible drive cable one of which is shown at 66 leading to a worm 68 in mesh with a worm gear 70 keyed or otherwise secured to a pinion 72 which is in mesh with one of the racks 46, 48 or 50, as for example the rack 46. It will be apparent that by operation of suitable electrical circuitry, the motor 60 may be energized and the appropriate one or more of the solenoids within the box 64 energized to connect the motor to the corresponding flexible drive cable which in turn effects actuation of a corresponding one of the racks 46, 48 or 50 to position the seat frame elements 28. Such suitable electric circuitry is set forth in Patent No. 3,105,669.

The position responsive switching device of the present invention is provided to actuate limit switches LS2, LS3, and LS4 as will be explained which are operable on the vehicle seat reaching limiting positions in respective directions of travel due to movement of racks 46, 48 and 50 to prevent further movement of said seat in the particular direction in which a limit has been reached. Position sensing switches S1, S2, S3, S4, S5 and S6 are also operable by the position responsive switching device of the invention as will later be explained. The switches S1, S2, S3, S4, S5 and S6 serve to make or break electrical connections to cause the motor 60 to rotate when necessary in a desired direction and to cause engagement or disengagement of appropriate ones of said clutches to cause the seat frame elements to move a seat supported thereon into a desired position. The details of the exact circuitry by which such results are accomplished are set forth in applicant's copending application referenced above, and since the circuitry therein disclosed forms no part of the position responsive switching device of the present invention it will not be considered in detail herein. Reference is made to the cited application for a complete discussion thereof.

Figure 5:
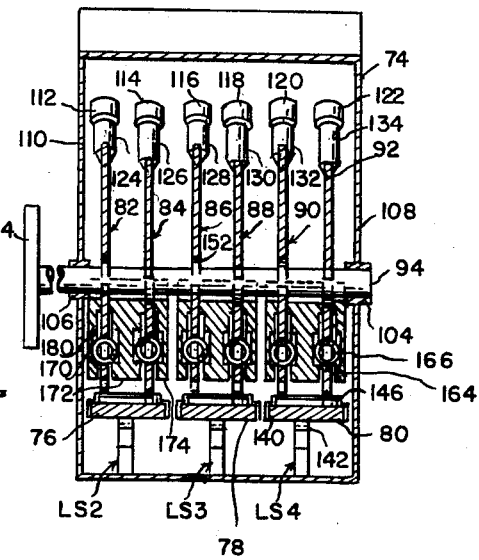
FIGURE 5 is a section through the position responsive switch of the invention taken on the line 5—5 in FIGURE 4.

Referring now to FIGURES 3-7 there is shown the particular position responsive switching device which is the subject matter of the present application. The position responsive switching device of the invention includes a housing or support member 74, switch actuating rack members 76, 78 and 80, camming discs 82, 84, 86, 88, 90 and 92, a positioning selecting crank or shaft 94, limit switches LS2, LS3 and LS4, and position sensing switches S1, S2, S3, S4, S5 and S6 arranged as shown in FIGURES 3-5.

With the components above enumerated assembled as shown in FIGURES 3-5 and with the rack members 76, 78 and 80 connected by means of Bowden wires to the individual rack members 46, 48 and 50 of seat adjusting mechanism shown in FIGURE 1 and the limit switches and position sensing switches connected in a control circuit as disclosed in applicant's copending application cited above the position responsive switching device of the invention is operable to prevent movement of the seat adjusting mechanism in any direction thereof after the seat has reached a limiting position with respect to that direction and to energize motor 60 and to cause selected ones of the racks 46, 48 and 50 to be driven thereby so that the vehicle seat may be brought to a predetermined position.

Figure 7:
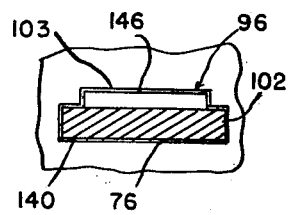
FIGURE 7 is an elevation view of a portion of the position responsive switch of the invention showing the connection between the racks thereof and the support therefor.

More specifically the housing 74 formed as shown in FIGURES 3-5 is adapted to be supported in any desired location, as for example bolted to the floor of a vehicle beneath a seat the movement of which is to be controlled. The housing 74 includes horizontal slots such as slot 96 shown in FIGURE 7 which are horizontally aligned and at the same level in opposite sides 98 and 100 of support 74. As shown in FIGURE 7 the slots 96 are provided with portions 102 at each end thereof forming guide channels in which racks 76, 78 and 80 are slidably mounted. It will be noted that the portion 103 of slots 96 allows passage of teeth 146 on racks 76, 78 and 80 therethrough.

Support 74 is also provided with annular bearings 104 and 106 in the sides 108 and 110 thereof adapted to rotatably receive the crank 94. Bosses 112, 114, 116, 118, 120 and 122 having openings therethrough for guiding switch actuating plungers 124, 126, 128, 130, 132 and 134 are provided on the interior of the upper wall 136 of support 74 as shown best in FIGURES 4 and 5. The separate housing portion 138 is provided attached to support 74 for housing the position sensing switches S1, S2, S3, S4, S5 and S6 as illustrated in FIGURE 4. Limit switches LS2, LS3 and LS4 are also supported by support 74 as illustrated.

The racks 76, 78 and 80 as best shown in FIGURES 4 and 5 and as indicated above are slidably mounted on support 74 in a horizontal position extending between slots 96 in opposite sides 98 and 100 of the support 74. The racks include portions 140 extending longitudinally on each side thereof adapted to be received in the guide channels 102. Each rack also includes a downwardly extending member 142 so positioned lengthwise thereof that it will contact the flexible member 144 of a limit switch LS2, LS3 or LS4 associated therewith when said rack is moved to a position corresponding to a limiting position of the seat in the direction with which the particular rack is associated to open the contacts of the switch. The racks 76, 78 and 80 are also provided with upwardly extending teeth 146 thereon as indicated in FIGURE 4 which on engagement of similar teeth 148 on camming discs associated therewith will cause movement of said camming discs with movement of the racks.

Thus it can be seen that the racks 76, 78 and 80 are slidably supported by the support 74, are positioned relative thereto by means such as the illustrated Bowden wire 150 which extends between the seat adjusting racks 46, 48 and 50 and the switch actuating racks 76, 78 and 80 respectively, to position the camming discs engaged with the switch actuating racks in accordance with the position of the vehicle seat. The racks 76, 78 and 80 also serve to open the limit switches LS2, LS3 and LS4 on said seat reaching a limiting position.

Figure 6:
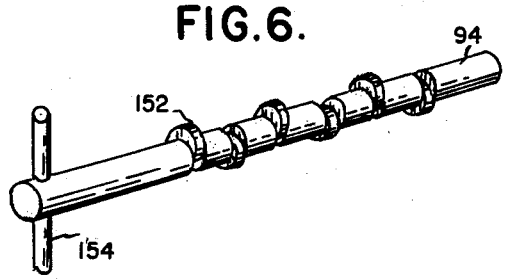
FIGURE 6 is a perspective of a portion of the crank of the switch of the invention showing the eccentric portions thereof.

Crank member 94 as illustrated best in FIGURE 6 is provided with eccentric portions 152 spaced therealong. Alternate portions 152 on crank 94 along the length thereof are eccentric in opposite directions as illustrated.

The crank 94 is mounted in assembly for rotation in bearings 104 and 106 on support 74 as shown in FIGURE 4. Crank 94 is also provided with a handle 154 on one end thereof exterior of the support 74 to permit manual rotation of crank 94.

Camming discs 82, 84, 86, 88, 90 and 92 as shown best in FIGURES 4 and 5 are mounted on the eccentric portions of crank 94. Each camming disc is provided with a cam surface having portions 156 and 158 on the circumference thereof and located at a different radial position with respect to the center thereof. The cam surface is also provided with a transitional portion 160 between the portions 156 and 158 thereof as shown best in FIGURE 4. Each camming disc is further provided with a toothed sector generally indicated 162 having teeth 148 circumferentially thereof adapted to engage the teeth 146 on the above described switch actuating racks. The camming discs are further provided with a circumferentially extending arcuate slot 164 located inwardly from the teeth 148 thereof as shown best in FIGURE 4. Slot 164 is provided to receive a compression spring 166 which will be discussed subsequently.

The camming discs are mounted on the crank 94 by means of substantially centrally located openings such as 168 therethrough. Openings 168 are vertically extended to permit rotation of crank 94 with the camming discs on the eccentric portions thereof without binding of the crank 94 and the camming discs or the camming discs and the respective switch actuating racks with which they are engaged. With the camming discs so positioned on crank 94 on the oppositely eccentric alternate portions thereof as illustrated best in FIGURE 5, it will be seen that when crank 94 is rotated in either a clockwise or a counterclockwise manner from a position in which the eccentric portions of the crank 94 extend horizontally in which all of the camming discs are in contact with the respective rack member associated therewith, that one camming disc associated with each rack member will be caused to move vertically upwards as the eccentric portion of the shaft on which it is secured is moved upwards while the adjacent camming discs will be caused to remain in contact with the racks associated therewith while the eccentric portions of the crank 94 on which they are mounted rotate to the bottom-most portion of the vertically extending openings 168 therein.

Thus as shown in FIGURE 5 with the crank 94 rotated so that the eccentric portions thereof on which the camming discs 82, 86 and 90 are mounted are in a vertically upward position, the camming discs 82, 86 and 90 will be raised to a position wherein the teeth 148 on the toothed sector thereof will be out of engagement with the teeth 146 on the respective rack members. At the same time the eccentric portions of the crank 94 associated with the camming discs 84, 88 and 92 will be rotated into a position wherein they will be at the bottom of the vertically extending openings 168 in these camming discs and the teeth on the toothed sectors of these camming discs will remain in contact with the respective racks associated therewith. Also it will be noted that during such rotation of the crank 94 no binding will take place between the crank and camming discs or the camming discs and racks.

On rotation of the crank 94 in the opposite direction so that the eccentric portions of the crank associated with the camming discs 84, 88 and 92 are in a vertically upward position the camming discs 84, 88 and 92 will be disengaged from their respective actuating racks while the camming discs 82, 86 and 90 will remain engaged therewith without binding in the manner indicated above.

As shown in FIGURES 3–5 three stationary plates 170, 172 and 174 are provided in conjunction with each pair of camming discs such as 82 and 84 associated with a single switch actuating rack such as 76. The plates 170, 172 and 174 extend entirely across the support 74 and are secured to the opposite sides 98 and 100 thereof as shown. The plates are provided with a half-circular recess 176 located centrally of the upper sides thereof to permit passage thereover of crank 94 and bosses 178 extending horizontally outward around the periphery of the half-circular recesses 176 as shown best in FIGURES 4 and 5 to provide positive axial spacing for the camming discs mounted on crank 94. The plates are also provided with arcuate recesses 180 in the surfaces thereof facing the camming discs. The arcuate recesses 180 extend adjacent the arcuate slots 164 in the camming discs and serve to retain the springs 166 within slots 164 and to prevent upward axial movement of the ends of the springs 166 on rotation of the camming discs. The springs 166 are thus compressed within an angularly decreasing slot on rotation of the camming discs so that on disengagement of the camming discs from the switch actuating racks associated therewith by means of rotation of the crank 94 the camming discs are biased by spring 166 into the position shown in FIGURE 4 wherein the springs 166 within the slots 164 and limited in endwise movement by the arcuate recesses 180 are extended the maximum amount possible. Also it will be noted that springs 166 acting against the stationary plates 170 tend to bias the camming discs downward into contact with the racks associated therewith.

In the operation of the position responsive switching device of the invention each of the racks 76, 78 and 80 are attached by means of Bowden wires such as 150 to seat actuating racks 46, 48 and 50 respectively which are operable to move a seat supported by the seat adjusting mechanism previously described. The racks 76, 78 and 80 are thus slidable within guide tracks 102 in accordance with the position of the seat being adjusted by the seat adjusting mechanism. Therefore in a memory type seat adjusting system such as described in applicant's above cited copending application wherein a seat may be moved to a fully lowered and retracted position by actuation of a single switch (not shown), the position responsive switching device of applicant may be used to stop the movement of the seat in a particular direction on the seat reaching a limit with respect to movement in that direction through opening of a limit switch LS2, LS3 or LS4 on contact therewith of a portion 142 of the associated switch actuating racks 76, 78 or 80 on the rack reaching a limiting position in that direction which may be the fully lowered and retracted position.

Thus as the fully lowered and retracted switch (not shown) is actuated by a person in the seat being adjusted individual circuits are completed through limit switches LS2, LS3 and LS4 causing each of the racks 46, 48 and 50 to tend to move the seat in a different direction to bring the seat to its fully lowered and retracted position. The movement of the racks 46, 48 and 50 is transferred through the Bowden wires such as 150 to the racks 76, 78 and 80. The limit switches LS2, LS3 and LS4 are so positioned with respect to the projections 142 that the individual circuits closed thereby which cause movement of the racks 46, 48 and 50 in particular directions are broken on the seat reaching fully lowered and retracted positions with respect to each direction.

Similarly with the crank 94 so positioned that the eccentric portions 152 thereof are horizontally extending thereby allowing each of the toothed sectors of the camming discs to be engaged by the respective actuating racks associated therewith in the manner above described it is possible to adjust the seat to one of two desired pre-set positions on the actuation of a "His" switch or a "Hers" switch as described in applicant's copending application. The operation of the "His" or "Hers" switch will complete circuits through selected position sensing switches S1, S2, S3, S4, S5 and S6 previously described which operate to cause the racks 46, 48 and 50 to move in a direction so that the racks 76, 78 and 80 of the position responsive switching device of the invention will move to rotate the camming discs associated therewith so that the switch actuating plungers associated with the "His" switches which may be switches S1, S3 and S5 are caused to ride on the transitional portions 160 of the camming surface on the cam wheels 82, 86 and 90 thus causing the switches S1, S3 and S5 to open breaking the circuit which caused movement of the racks 46, 48 and 50. In a similar manner the operation of the "Hers" switch by a person desiring to adjust the seat to a pre-selected "Hers" position will cause movement of the switch actuating racks 76, 78 and 80 so that the cam wheels 84, 88 and 92 are rotated in a direction to cause the switch actuating plungers associated with the "Hers" switches S2, S4 and S6 to rest on the transitional portion of the cam surface of the camming discs causing the "Hers" switches to assume an open position stopping the actuation of rack members 46, 48 and 50.

When it is desired to change the pre-selected position of the seat at which the "His" or "Hers" switches open it is necessary with the position responsive switching device of the invention to first position the seat in the new position which it is desired to have the position responsive switching device of the invention remember and to then turn crank 94 into the position as shown in FIGURE 5 or into a position a full half turn therefrom so that either the camming wheels 82, 86 and 90 associated with the "His" position sensing switches or the camming wheels 84, 88 and 92 associated with the "Hers" position sensing switches are disengaged from the racks 76, 78 and 80 and allowed to assume the position shown in FIGURE 4 under bias from spring 166 wherein the switch actuating plungers associated therewith are in contact with the transitional portion of the camming surface 160 of the camming wheels. The crank 94 is then turned a quarter turn to the usual operating position thereof reengaging the previously disengaged and repositioned camming discs with the switch actuating racks. It will now be apparent that whenever the seat is so moved that it returns to the position it was in when the camming discs were disengaged from the switch actuating racks that the switches associated with these particular camming discs will be in the open position as shown in FIGURE 4 which will halt movement of the seat at such position as previously explained.

Thus it is seen that applicant has provided a position responsive switching device capable of breaking electrical circuits when an article whose position is sensed thereby reaches a limiting position. Furthermore applicant's position responsive switching device is capable of remembering selected positions of the article other than the limiting position and actuating position sensing switches in such a manner that the position sensing switches will be opened when the article is in the remembered position thereof and will be closed in one direction or the other at any time the article is not in a remembered position, the direction of closure of said position sensing switches being determined by the direction of the article with respect to the remembered position thereof.

The drawings and the foregoing specification constitute a description of the improved position responsive switching device in such full, clear, concise and exact terms as to enable any person skilled in the art to practice the invention, the scope of which is indicated by the appended claims.

What I claim as my invention is:

1. A position responsive switching device comprising a support, a first member supported thereby and movable relative thereto in response to the position of an article, a second member mounted on said support, rotatable means mounting said second member on said support for engaging and disengaging said second member with said first member on rotation of said rotatable means, said second member being movable by said first member when said first and second members are engaged, means acting between said support and said second member tending to bias said second member into engagement with said first member at all times and to return said second member to a fixed predetermined position on disengagement of said first and second member, and a position sensing switch operably associated with said second member and actuable thereby on movement thereof.

2. A position responsive switching device comprising a support, a first member supported thereby for movement relative thereto in accordance with the position of an article, a second member mounted on said support, rotatable means mounting said second member on said support for engaging and disengaging said second member with said first member on rotation of said rotatable means, said second member being movable by said first member when said first and second members are engaged, means acting between said support and said second member for biasing said second member into engagement with said first member and for returning said second member to a predetermined position on disengagement of said first and second member, a limit switch operably associated with said first member for actuation on said first member reaching a limiting position, and a position sensing switch operably associated with said second member for actuation thereby on movement thereof to be open when said second member is in said predetermined position and to be closed through different portions thereof when said second member is not in said predetermined position.

3. A position responsive switching device comprising a support, first members supported thereby for movement relative thereto in accordance with the position of an article, pairs of second members, means for mounting said pairs of second members on said support, said means being operable to engage and disengage said second members with said first members, said second members being movable by said first members when said first and second members are engaged, means acting between said support and said second members for biasing said second members into engagement with said first members and for returning said second members to a predetermined position on disengagement of said first and second members, and a position sensing switch operably associated with each of said second members and actuable thereby on movement thereof.

4. A position responsive switching device comprising a support, first members supported thereby for movement relative thereto in accordance with the position of an article, pairs of second members, means for mounting said pairs of second members on said support, said mean being operable to selectively engage and disengage one of each of said pairs of second members with a first member associated therewith, each pair of second members being movable by the first member associated therewith when said first and second members are engaged, means acting between said support and said second members for biasing said second members into engagement with said first members and for returning said second members to a predetermined position on disengagement of said first and second members, and a position sensing switch operably associated with each of said second members and actuable thereby on movement thereof.

5. A position responsive switching device comprising a support, a rack supported thereon in guide channels for sliding movement relative thereto in accordance with the position of an article, a camming disc including a toothed sector, rotatable means for mounting said camming disc on said support, said means being operable on rotation to engage and disengage the toothed sector of said camming disc with said rack, said camming disc being movable by said rack when said camming disc and rack are engaged, means acting between said support and said camming disc for biasing said camming disc into engagement with said rack and for returning said camming disc to a predetermined position on disengagement of said camming disc and rack, and a position sensing switch operably associated with said camming disc and actuable thereby on movement thereof.

6. The structure as claimed in claim 5 wherein said camming disc has a circumferential cam surface including portions at different radial locations and a transitional portion therebetween of varying radial location, and said position sensing switch has an actuating member biased into contact with said transitional portion of said cam surface when said camming disc is in said predetermined position to open said switch and biased into contact with said portions of said cam surface at different radial locations when said camming disc is not in said predetermined position to close said switch in different directions.

7. The structure as claimed in claim 5 wherein said means acting between said support and said camming disc for biasing said camming disc into engagement with said rack and for returning said camming disc to a predetermined position on disengagement of said camming disc and rack comprises a circumferentially extending arcuate slot in said camming disc, a compression spring within said slot and stationary means for holding said spring within said slot and for preventing circumferential movement of opposite ends of said spring on rotation of said camming disc in opposite directions.

8. The structure as claimed in claim 5 wherein said means for mounting said camming disc on said support is a shaft rotatably secured to said support and having an eccentric portion along the length thereof on which said camming disc is mounted.

9. The structure as claimed in claim 8 wherein said camming disc is provided with a centrally located slot therein through which said shaft extends to prevent binding of said camming disc and shaft on rotation of said shaft in one direction.

10. A switch, a movable member adjacent said switch comprising a rotatably mounted disc including a pair of radially differently located peripheral cam surfaces thereon and a transitional cam surface extending between said pair of cam surfaces operable to actuate said switch in only one position of the movable member, means engaged with said movable member for moving said member in response to the position of an article, means for returning said movable member to said one position on disengagement of said member from said means, and means mounting said movable member operable on actuation to disengage said movable member and said means for moving said member.

11. Structure as set forth in claim 10 wherein the movable member has an arcuate slot therein and wherein said means for returning said movable member to said one position comprises a fixed member adjacent said movable member having an arcuate recess therein and a compression spring positioned partly within each of said slot and recess.

12. Structure as claimed in claim 10 wherein said means operable to disengage said member and said means for moving said member comprises a rotatable shaft having an eccentric portion thereon rotatably mounting the movable member.

13. A position responsive switching device comprising a support, a plurality of racks slidably supported on said support, means for slidably positioning said racks in accordance with the position of an article, a shaft rotatably supported by said support extending transversely of said support with respect to said racks and having a pair of eccentric portions spaced longitudinally thereof associated with each of said racks, a camming disc mounted on each of the eccentric portions of said shaft each including a toothed sector engageable with and disengageable from one of said racks on rotation of said shaft and a camming surface, separate means operable between said support and each of said camming discs for biasing said toothed sectors into engagement with the associated racks and for biasing said camming discs into a predetermined position, and a position responsive switch associated with each of said camming discs including an actuating member engageable with the camming surface of the associated camming disc and means for completing different electric circuits on rotation of the camming discs in opposite directions from the predetermined position thereof.

14. Structure as claimed in claim 13 wherein the separate eccentric portions of each of said pairs of eccentric portions of said shaft are eccentric in opposite directions whereby on rotation of said shaft in either direction only one of each pair of camming discs is moved so that the toothed sector thereof disengages the associated rack.

15. Structure as claimed in claim 14 wherein said camming discs are provided with a central slot therein through which said shaft extends operable to prevent binding of said shaft and the camming discs which remain engaged with their associated racks on rotation of the shaft.

16. Structure as claimed in claim 13 wherein said means for biasing the camming discs into a predetermined position and for biasing the toothed sectors into engagement with the racks comprises a circumferentially extending arcuate slot in each camming disc, plates extending parallel to the plane of the camming discs on each side thereof having arcuate recesses therein aligned with said arcuate slots in the associated camming discs with the camming discs in the predetermined position thereof and a compression spring within each of said arcuate slots extending into said arcuate recesses.

17. Structure as claimed in claim 13 and further including a stationarily mounted limit switch associated with each of said racks and abutment means on each of said racks operable to open the associated limit switches on movement of the associated rack to a limiting position thereof.

18. A switch, a rotatable toothed sector camming member positioned adjacent said switch operable to actuate said switch in only one position of the camming member, a rack engaged with said camming member for rotatably moving said camming member in response to the position of a seat, means for returning said camming member to said one position on disengagement of said camming member from said rack, and a rotatable shaft having eccentric portions rotatably mounting said camming member, said shaft being operable on rotation to disengage said cam member and said rack.

References Cited by the Examiner
UNITED STATES PATENTS

| | | | |
|---|---|---|---|
| 1,299,159 | 4/19 | Feldman | 200—153 |
| 1,853,188 | 4/32 | Wood | 74—405 |
| 2,389,350 | 11/45 | Exner | 200—47 |
| 2,420,865 | 5/47 | Conlan | 200—50 |
| 2,432,782 | 12/47 | McClain | 200—153 |
| 2,614,625 | 10/52 | DiIenno | 74—405 |
| 2,675,228 | 4/54 | Baird et al. | 200—153 |
| 2,720,619 | 10/55 | James | 318—31 |
| 2,833,976 | 5/58 | Kennedy | 318—467 |
| 2,914,953 | 12/59 | Tyzack | 318—467 X |
| 2,982,335 | 5/61 | Garvey | 318—467 |
| 2,983,545 | 5/61 | Garvey et al. | 318—467 |

BERNARD A. GILHEANY, *Primary Examiner.*

GEORGE L. BREHM, MAX L. LEVY, *Examiners.*